DRIVE CIRCUIT FOR AN INDUCTIVE LOAD

Filed May 1, 1961 5 Sheets-Sheet 1

INVENTOR.
ALAN K. JENSEN
BY Charles L. Johnson Jr.
ATTORNEY

INVENTOR.
ALAN K. JENSEN
BY Charles L. Johnson Jr.
ATTORNEY

INVENTOR.
ALAN K. JENSEN
BY Charles L. Johnson Jr.
ATTORNEY

Feb. 1, 1966 A. K. JENSEN 3,233,246

DRIVE CIRCUIT FOR AN INDUCTIVE LOAD

Filed May 1, 1961 5 Sheets-Sheet 4

INVENTOR.
ALAN K. JENSEN
BY Charles L. Johnson Jr.
ATTORNEY

DRIVE CIRCUIT FOR AN INDUCTIVE LOAD

Filed May 1, 1961 5 Sheets-Sheet 5

INVENTOR.
ALAN K. JENSEN
BY Charles L. Johnson Jr.
ATTORNEY 3,233,246

DRIVE CIRCUIT FOR AN INDUCTIVE LOAD

Alan K. Jensen, Dover, N.J., assignor to Monroe International Corporation, a corporation of Delaware Filed May 1, 1961, Ser. No. 106,746
8 Claims. (Cl. 346—74)

This invention relates generally to drive circuits and more particularly to transistor circuit arrangements wherein the object is to reduce the power dissipation in a transistor whose output is utilized in driving an inductive load.

In providing solutions for various electronic circuit problems it is often necessary to cope with a plurality of design criteria, each of which has its own limiting value. Circuitry for recording on the surface of a magnetic drum is representative. Inasmuch as the pulses which feed an inductive magnetic head are critical as to shape and amplitude, the parameters of current, voltage, switching speed and the power dissipation in the driving circuit, all become important.

Previously, when the power dissipation in the driving circuit has proved excessive, resort has often been taken to reduction of the inductive load or by the utilization of parallel drive units. Transistors in parallel is a common example of the method of providing the power dissipation capacity needed for the drive circuit. It is to the solution of this type of problem that this invention is directed.

It is therefore an object of this invention to provide an improved drive circuit.

It is another object of this invention to provide reduced power dissipation in a driving circuit.

It is a further object of the invention to provide reduced power dissipation in a transistor connected to provide electrical signals to an inductive load.

It is a still further object of the invention to provide means for shaping electrical pulses.

It is a more specific object of the invention to provide a transistor circuit capable of reducing the power dissipation in a transistor connected to apply pulse signals to the inductive load of a magnetic recording head.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

Figure 5:
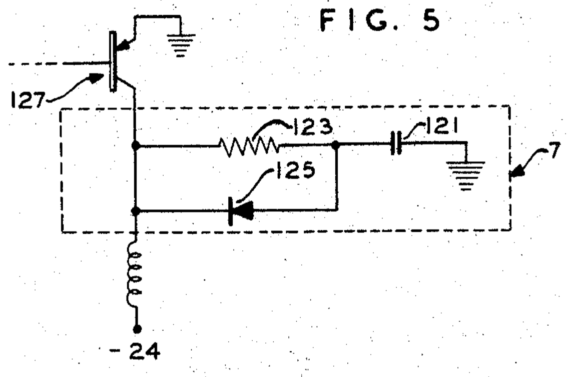
FIG. 5 is a detailed schematic of an important feature of the invention.
Figure 6:
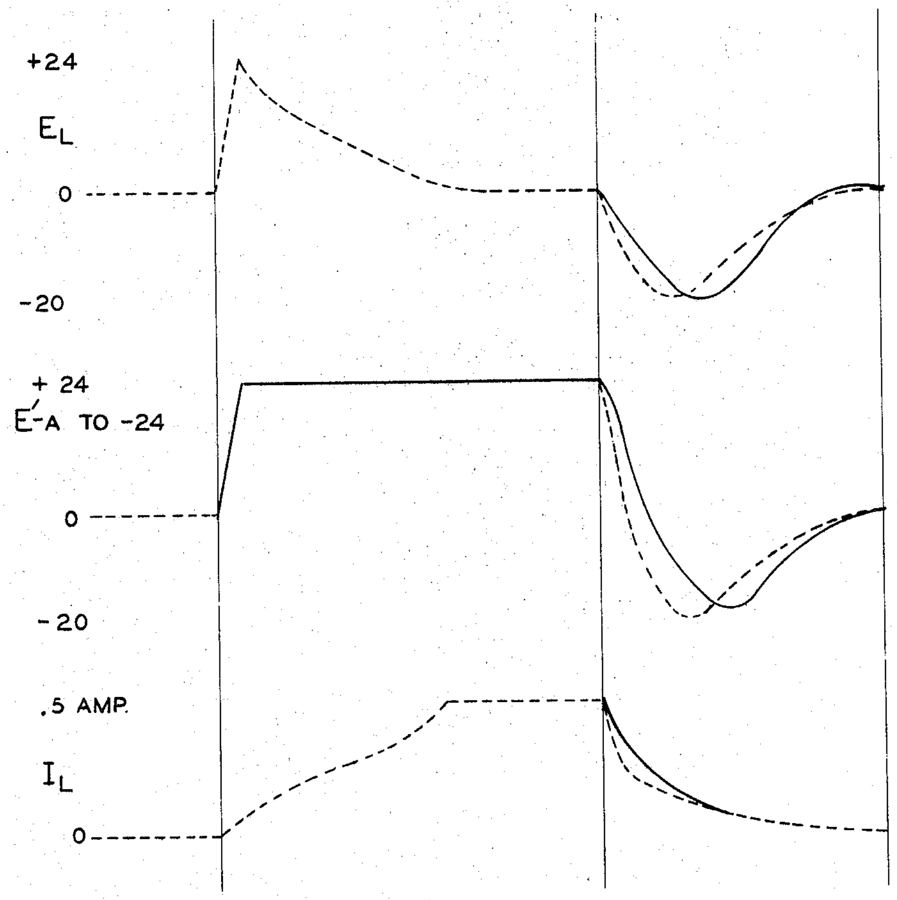
Figure 6A:
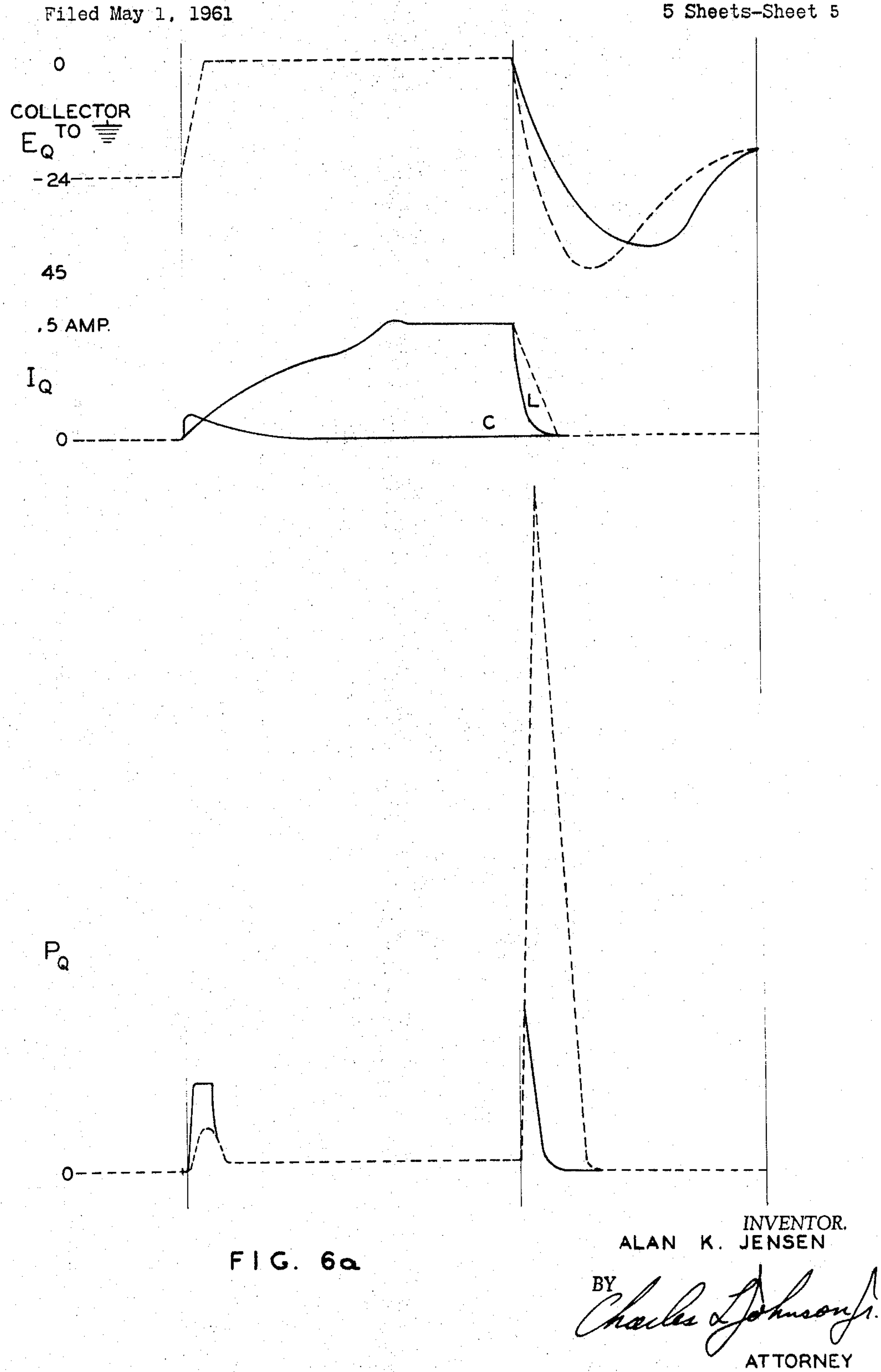

FIGS. 6 and 6*a* are diagrammatic illustrations of voltage, current and power dissipation in an inductive drive circuit with and without the feature of FIG. 5.

The preferred embodiment of the invention includes the use of capacitor means in series with a resistor-diode parallel combination. This circuit is placed between the inductive load and any A.C. ground, in the illustrated arrangement, which operates with the inductive load returned to a negative potential.

In the following detailed description of the apparatus by which the objects of the invention are realized, the use of circuitry to activate or drive the inductive load of a magnetic recording head is used as an example. It should be realized however that other types of loads may be utilized.

A major feature of the invention is illustrated in FIG. 5 wherein the capacitor-resistor-diode arrangement acts to delay the voltage across the load to thereby reduce the peak and average power across the transistor so as to in turn reduce the power dissipation in the transistor.

In recording, the recording head represents an inductive load to the record amplifier. At high frequencies and for high storage densities it is essential that a current build up and decay in the head in a minimum of time.

It is well known that for a given inductance and current requirement there will be minimum voltage that will satisfy these time requirements. The voltage demanded by this relationship is beyond the limits of many transistors which have the switching speed required to apply the desired voltage. Inasmuch as the voltage leads the current in an inductance, when a pulse is applied, there will be a time near the end of the pulse, where a peak of high dissipation will occur. This occurs when both the ment may utilize a standard machine clock for the tim- Reduction of record head inductance may be accomplished by lowering the number of turns in the recording head. The desirability of this action is limited, since the magnetomotive force required to write or record on a magnetic drum must be maintained. To compensate for this the current must be increased proportional to the turns reduction. Even though transistors handle large currents in preference to voltage, there exist problems in the supplying of these currents and controlling the undesirable magnetic coupling created in transmitting them to a record head.

As stated previously there exists a peak power period at the end of the voltage pulse when both the current and voltage are simultaneously high. To reduce the total power dissipation in the component parts it is desirable to minimize the time in this region. In short, it is desirable that the transistor turn off as rapidly as possible.

Figure 1:
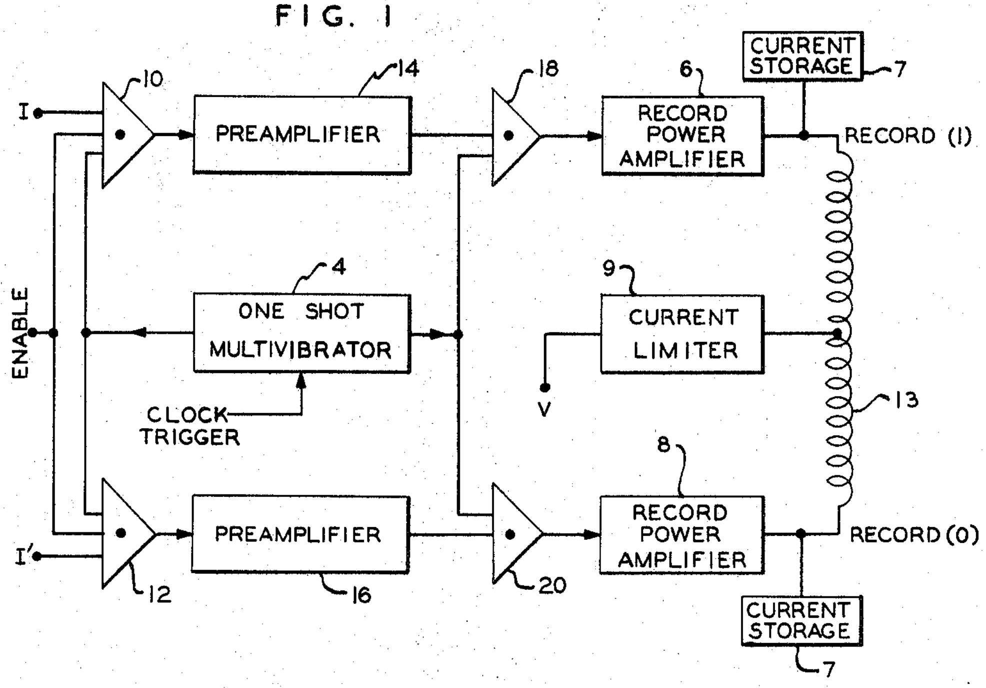
FIG. 1 is a block diagram of a first record circuit which utilizes the invention.
Figure 2:
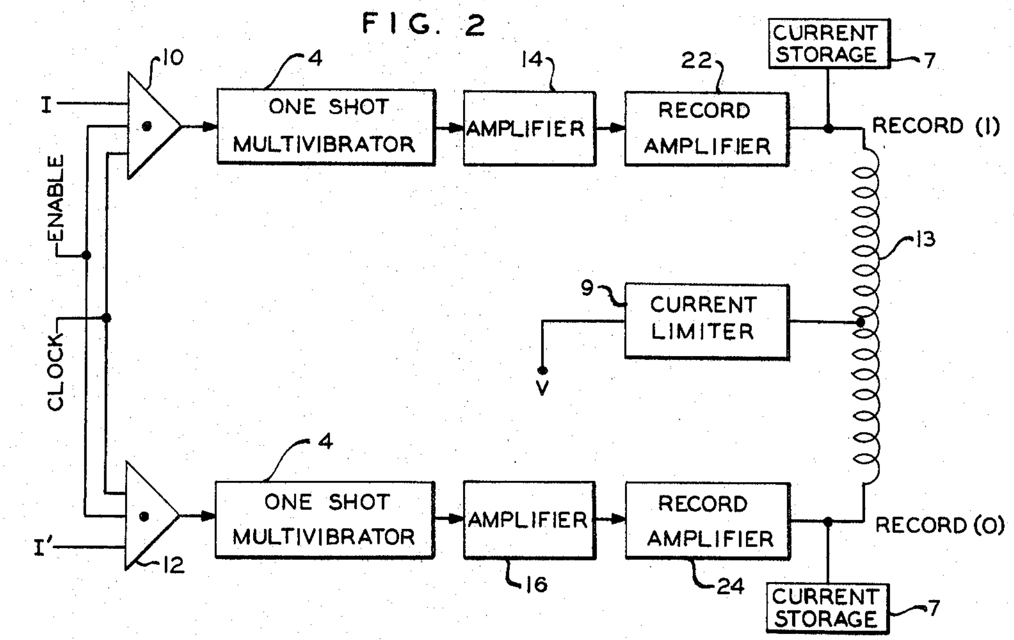
FIG. 2 is a block diagram of a second record circuit which utilizes the invention.

Referring now to the drawings, FIGS. 1 and 2 are block diagrams of two record circuits which differ primarily in the logic for controlling the time and width of the pulse to be recorded.

In both circuits, one-shot multivibrators 4 are used to set the pulse width.

In the circuit of FIG. 1 a single one-shot is time shared between the ONES and ZEROS record amplifiers 6 and 8. This is done to provide optimum matching of drive pulses to the two amplifiers as well as for economy reasons as realized by the reduced number of components. The one-shot circuit 4 is triggered by each clock pulse whether information is to be recorded on the drum or not. It opens the input AND gates 10 and 12 and where a high signal exists the corresponding preamplifier 14 or 16 shapes the pulse and feeds it via the second AND gate 18 or 20 to the respective power amplifier 6 or 8. The second AND gate 18 or 20 is logically redundant. However, upon termination of the pulse it provides a high speed path to the record power amplifiers 6 and 8 and thereby eliminates the turn-off delay differences in the two preamplifiers 14 and 16.

Inasmuch as the one-shot 4 is actually used to turn off the output amplifier, considerable power is necessary. In fact if the AND gate is not a common diode type it requires that the one-shot be capable of overriding the preamplifier drive. This will be illustrated in detail subsequently.

Current storage apparatus 7 is connected between the record amplifiers 6 and 8 and the record head 13, and acts to store current during portions of the record pulses.

Current limiter 9 includes a varistor and is returned to a current source which in the preferred embodiment is a −24 volt supply.

In the circuit of FIG. 2 the ONES and ZEROS amplifiers 22 and 24 contain independent one-shots for width control. These one-shots provide memory as well as width control and they may be operated with a standard machine clock. The control apparatus 7 and 9 is connected as in FIG. 1 to control the current through the record head 13 and record amplifiers 22 and 24.

At this point the circuits of FIGS. 3 and 4 will be described in detail up to the point of the power amplifier block. From here on the circuits are identical and will be handled as one.

Figure 3:
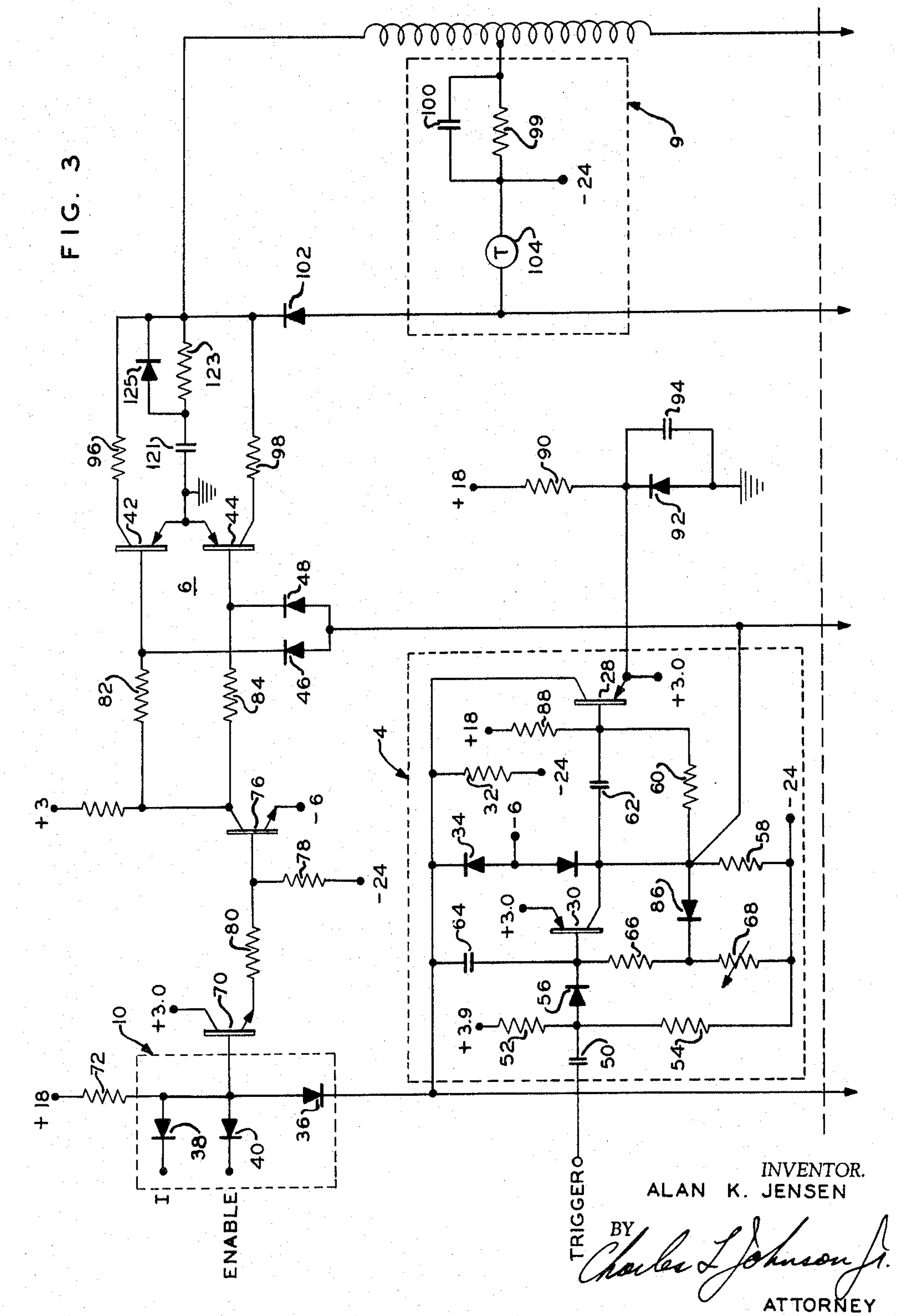
FIG. 3 is a schematic representation of the block diagram of FIG. 1.

FIG. 3 is a schematic diagram of the circuit of FIG. 1. Only one amplifier channel is illustrated since, as indicated on the drawing, the amplifiers are identical. The circuit within the block 4 contains the one-shot width control.

Transistors 28 and 30 form the one-shot and are normally in the OFF and ON states respectively. Transistor 28 being OFF allows impedance 32 to hold the cathode end of diode 36 negative to −6 volts to thereby block the AND gate formed with diodes 38 and 40. Transistor 30 being ON holds the bases of transistors 42 and 44, through diodes 46 and 48 to approximately +3 volts thereby biasing them OFF.

The trigger network for the one-shot circuit is formed by condenser 50, impedances 52 and 54 and diode 56. The positive edge of the trigger pulse is fed through condenser 50, and diode 56 to the base of transistor 30, turning if OFF. The collector of transistor 30 goes negative due to impedance 58 and establishes turn ON current to transistor 28 via impedance 60 and capacitance 62. The collector of transistor 28 moves to +3 volts and provides feedback through capacitance 64 to hold transistor 30 OFF until capacitance 64 is discharged by impedances 66 and 68.

While the one-shot is in this stable condition the AND gate 10 on the base of transistor 70 is opened and if a high exists on diodes 38 and 40 from the information source and the enable pulse, the base and emitter of transistor 70 will travel to the upper logical level due to base current from impedance 72. Impedance 80 establishes a noise immunity threshold on the base of transistor 76 due to the divider action with impedance 78. Impedance 80 also limits the base drive to transistor 76. If the threshold is exceeded, as will be the case if an acceptable input exists, transistor 76 will turn ON and supply base drive to the power amplifier, comprising transistors 42 and 44, via impedances 82 and 84. Recalling that the one-shot was left in the astable condition with the transistor 30 OFF and its collector negative, it will be noted that diodes 46 and 48 are back biased.

Still referring to FIG. 3, when impedances 66 and 68 succeed in discharging capacitance 64, their current will be fed to the base of transistor 30 which will then turn ON, supplying turn OFF to transistor 28 by way of capacitor 62 and to transistors 42 and 44 via diodes 46 and 48. At this time the output pulse from transistors 42 and 44 will be terminated. Impedance 32 will again block the input AND gate 10 and transistor 76 will turn OFF. As implied previously, transistor 30 turning ON is the first step in the shut-down process and therefore will initially have to overcome the drive from transistor 76 in order to turn OFF the power amplifier 6.

Still referring to FIG. 3, impedances 52 and 54 provide a triggering threshold on diode 56 and a D.C. recovery path for capacitance 50. The time constant of capacitance 50 and impedances 52 with 54 is selected to be shorter than the shortest time constant of capacitance 64 with impedances 66 plus 68. This is required to make the one-shot period independent of the trigger pulse amplitude. Impedance 66 supplies an antisaturation reference level for diode 86. Impedance 88 supplies hold OFF bias for transistor 28 during the stable state.

Impedance 90, Zener diode 92 and capacitance 94 provide a +3 volt power supply for use as the one-shot reference and antisaturation for transistor 70. The two input diodes 38 and 40 are provided to allow external blocking of the record. A low signal to either diode will serve this purpose. Impedance 68 is of the variable type in order that the pulse width may be adjusted.

The basic operation of this circuit has been described up to the point of the output transistors and magnetic recording head circuitry.

Figure 4:
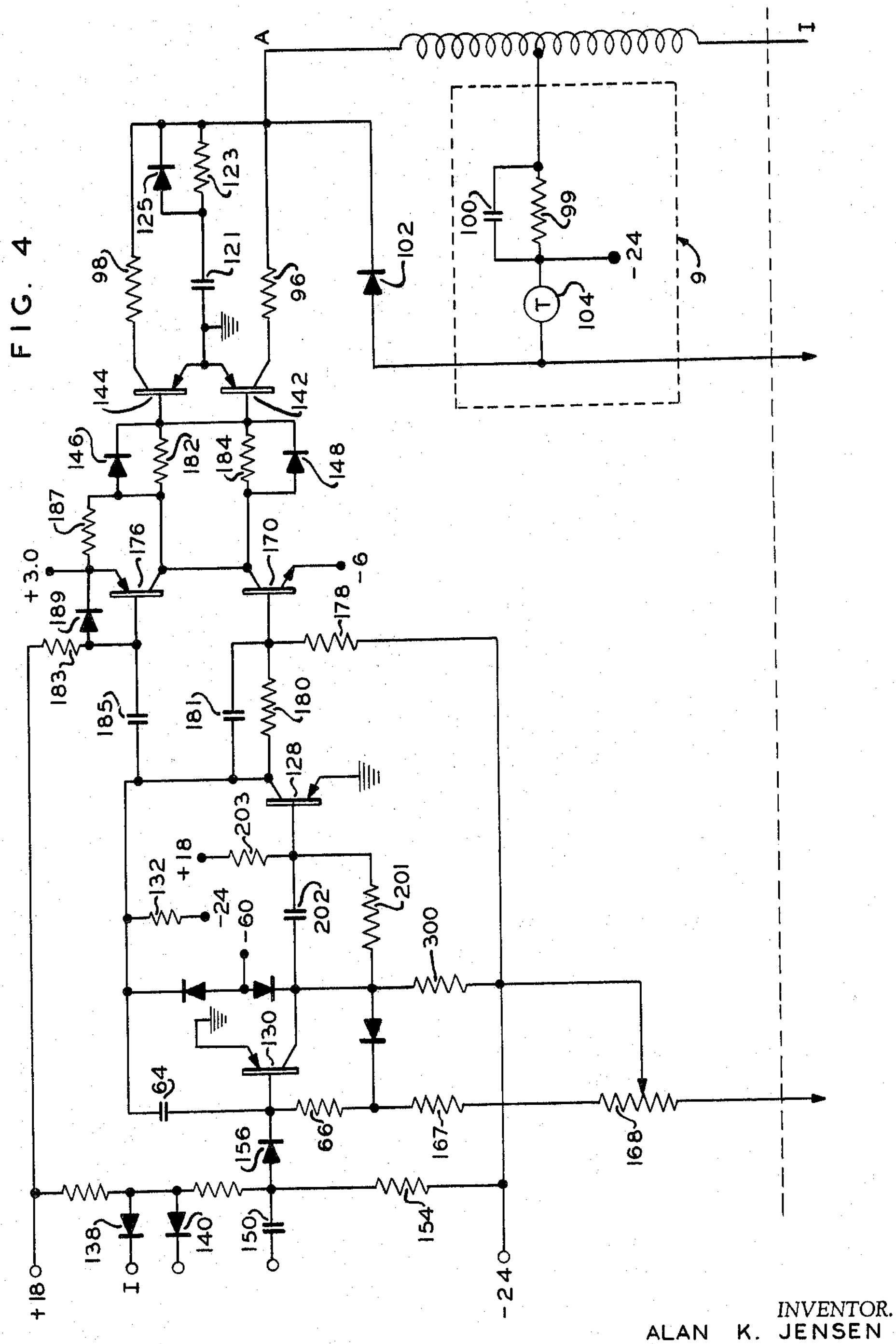
FIG. 4 is a schematic representation of the block diagram of FIG. 2.

Referring now to FIG. 4, which is a schematic representation of the block diagram of FIG. 2, only one half of the circuit will be illustrated.

In FIG. 4 it will be seen that transistors 128 and 130 form the one-shot multivibrator for width control. Transistors 170 and 176 form a push-pull low impedance drive for the power amplifier transistors 142 and 144.

The one-shot circuit arrangement of transistors 128 and 130 may be recognized as similar to the corresponding circuit of FIG. 3. The primary distinguishing feature exists in the method of triggering. Diodes 138 and 140, impedances 172, 152 and 154, and capacitance 150 form a trigger for the one-shot in the circuit. Such an arrangement may utilize a standard machine clock for the timing signals.

If, during the previous bit time, both the I and enable D.C. levels have been high, the internal terminal of capacitance 150 will become charged to near ground potential. Upon the appearance of a positive-going clock, diode 153 will be forward biased so as to turn OFF transistor 130 and the one-shot performs as described previously in reference to FIG. 3. Here again, the time constant of capacitance 150 with impedances 152 and 154 is made short as compared with the time constant of capacitance 64, with impedances 66, 167 and 168, so as not to influence pulse width. Impedance 152 is also used to minimize the trigger current escaping by way of diodes 138 and 140 as well as setting a trigger threshold potential.

Triggering of the one-shot multivibrator turns ON transistor 128 causing its collector potential, which is moving toward ground, to be coupled through impedance 180 and capacitance 181 to provide turn-ON drive for the NPN transistor 170. Transistor 176 is meanwhile biased OFF due to impedance 183 and the positive moving transient through capacitance 185. The collectors of transistors 170 and 176 are pulled to −6 volts by transistor 170 and turn-ON drive is supplied to the power amplifiers 142 and 144 via impedances 182 and 184.

When the one-shot period has terminated transistor 128 will turn OFF or cease conducting at its previous rate thereby allowing impedance 132 to supply turn-OFF current for transistor 170 and turn-ON current for transistor 176. When transistor 176 conducts it pulls the collectors of transistors 170 and 176 to the +3 volt potential and supplies turn-OFF current to transistors 142 and 144 by way of the low impedance path of diodes 146 and 148. Transistor 176 will remain ON only so long as it takes capacitance 185 to charge through its input impedance, after which impedance 187 provides bias to prevent conduction of transistors 142 and 144. To complete the description of FIG. 4, impedance 183 and diode 189 are connected so as to supply the quiescent OFF bias for transistor 176 while impedance 178 serves in a similar capacity to transistor 170. Impedance 168 for both one-shots is a single potentiometer whose center tap is returned to a −24 volt potential source. It may therefore be seen that adjustment of impedance 168 may provide pulse width matching for the one-shot multivibrators.

To properly record information upon a magnetic drum the trigger circuits, a power amplifier and the magnetic head each must function satisfactorily. The circuits of FIGS. 3 and 4, described above provide those elements of the invention which deal with the formation of the pulses from which magnetic drum recording is realized.

The component values of FIGS. 3 and 4 of one successful embodiment are as follows: Diodes are of the type GTD970.

| Part number: | Value (ohms) |
|---|---|
| 96, 98 | 10 |
| 99 | 47 |
| 82, 84, 123, 182, 184 | 200 |
| 90 | 300 |
| 66, 80 | 500 |
| 32, 52, 180, 187 | K 1 |
| 58, 152, 200 | K 2 |
| 78 | K 3 |
| 60, 201 | K 3.9 |
| 54, 68, 72, 172 | K 10 |
| 167 | K 12 |
| 154, 168, 178, 183 | K 20 |
| 88, 203 | K 33 |
| | Value μf |
| 100 | .002 |
| 121 | .003 |
| 94 | 0.1 |
| 64 | .00025 |
| 50, 150 | .000270 |
| 62, 181, 185, 202 | .000470 |
| Transistor types: | |
| 70, 76, 170 | 2N585 |
| 176 | 2N316 |
| 28, 30, 128, 130 | 2N412 |

In order to properly record on a magnetic drum, four basic parameters in power amplifier circuitry are current, voltage, switching speed and power dissipation. Of these, current is perhaps the least objectionable due to the inherent nature of transistors which allow large currents. Some conventional circuits utilize approximately 30 turns so as to place the record current at upward of 0.5 amperes in order to maintain a fifteen ampere-turn record level. The majority of the components currently in use can not meet the desired combination of current capacity, voltage, speed and power dissipation. To alleviate the power dissipation problem the present art resorts to paralleling two transistors. Example of this practice is illustrated by transistors 42 and 44 of FIG. 3 and by transistors 142 and 144 of FIG. 4. When paralleling transistors in this manner it is advisable to insure sharing of the load. Impedances 182 and 184 should be used in series with the drive paths to insure equal base current to both transistors since their input impedances may differ greatly. Impedances 96 and 98 are connected to provide equal sharing of the current to the magnetic recording head.

The amplitude of the current is a further important aspect that must be accounted for. One means of current amplitude control exists in the circuit. Inasmuch as the pulse width is controlled the maximum current attained is fixed as long as the —24 volt record voltage is fixed. This control is further aided by the discharge of capacitance 64 and therefore the pulse width is inversely proportional to the absolute value of the —24 volt power supply. This compensation is inadequate however inasmuch as the pulse width change is approximately a linear function of the power supply while the head current build-up is not, due to operation of the head in a saturated condition. Impedance 99 is connected so as to limit the head current to a value independent of pulse width. The total limiting impedance also includes the parallel combination of impedances 96 and 98. It should be realized that this current control is not completely controlling since the current will vary in a manner proportional to the record potential. It is well recognized that a range of record level variations can provide adequate signals. Control circuits may of course be provided to prevent recording below the desired ampere-turn level.

The use of impedance 99 has a deteremental effect upon the speed of current build-up. Although the inductance to impedance time constant is shorter, the final or aiming current is lower and the time to attain any given current is lengthened. The speed may be regained to some extent by bypassing impedance 99 with the capacitance 100. Capacitance 100 is normally selected for the largest value which yields an insignificant current overshoot. In the preferred embodiment a value of .002 μfarad was utilized. Capacitance 100 is also important in lowering the voltage requirements on the transistors. When the voltage pluse is terminated, the transistor end of the current carrying winding will go negative with respect to the power supply in an effort to maintain that instantaneous current. Still referring to FIGS. 3 and 4, capacitance 100 maintains the center tap of the head at a potential positive with respect to the power supply until it can be discharged by impedance 99. As a result the transistor end of the winding will travel less negative and thereby reduce the potential presented to the transistors. By providing faster current decay voltage limiting of this type is more efficient than common damping to the same collector potential since the reverse head voltage may be instantaneously larger.

More conventional, but not common resistive damping, is also used to limit the collector voltage. Diode 102 is connected to the record supply in series with a varistor 104. The impedance of a varistor is inversely proportional to applied voltage raised to some power. This exponential is commonly referred to as the N factor and may be found in any value up to approximately 4.0. To obtain maximum record resolution it is desirable to shorten the time required to reduce the head current to zero. The rate of decay of current is proportional to the overshoot voltage. Therefore, the greater the amplitude of this voltage, the shorter the duration of time it must exist. If a maximum tolerable voltage is selected and the proper damping impedance chosen to realize that voltage limit, the voltage and current will decay from maximum values in an exponential fashion. Assuming the initial potential is proper, to maintain the voltage for a longer period of time will cause the current to decay more rapidly. A varistor, being a nonlinear resistor tends to do just this and so provide higher speed at no reduction in voltage requirements. It may thus be seen that a zener diode may serve as an even more efficient damping element and such an arrangement is contemplated by this invention. In FIG. 4, by the use of capacitance 100, impedance 99 and the varistor 104, reduction of transistor dissipation and optimum current pulse shape is realized.

Further reduction in the power dissipated in the power amplifier transistors is realized by the arrangement of capacitance 121, impedance 123 and diode 125, as shown in FIGS. 3, 4, and 5.

FIG. 6 illustrates various waveforms which exist with and without the use of the FIG. 5 circuit. The solid line represents the values when the circuit is used while the dotted line shows values without the improvement. As stated previously and as may be seen by the dotted portion of the power graph $P_Q$ of FIG. 6a, representing power dissipated in the transistor, a high peak dissipation point exists at the termination of the pulse. At this point the head current is at a maximum, as may be seen by graph $I_L$ of FIG. 6, representing load current, and the transistor is entering its high impedance region, hence, the collector voltage is simultaneously high. This is shown by graph $E_Q$ of FIG. 6a. $I_Q$ of FIG. 6a represents transistor current, $E_Q$ represents voltage across the transistor, $E_L$ represents voltage across the inductive load and E′ represents the voltage measured from point A to the —24 volt supply during a record pulse.

When the transistor first turns ON the transistor current is low since the initial current required by the record head is zero. This may be seen from the load current graph $I_L$ of FIG. 6. While conducting and saturated the drive transistor 127, as illustrated in FIG. 5, is capable of carrying high currents. An important feature of this invention is the circuit's ability of store some of this current and switch it into the record head at the end of the pulse. In this manner the transistor is aided over its critical high power dissipation point.

Between pulses capacitance 121 is charged to the potential of the record power supply. During the early portion of the pulse, while the head current is low, the excess collector current is used to discharge capacitance 121. This is illustrated by curve C of graph $I_Q$ in FIG. 6. The discharge path is through impedance 123 which is used to limit the discharge current. At the end of the pulse, as the transistor turns OFF and the collector voltage increases, diode 125 becomes forward biased and supplies a low impedance charge path for capacitance 121 through the record head. The head current during turn-OFF is therefore partially stored in capacitance 121 and the transistor current is lowered. On the next pulse the transistor discharges capacitance 121.

It is important to note that the faster the transistor turns OFF the more current and power will be absorbed by capacitance 121. Conversely the slower the transistor turns OFF, the larger capacitance 121 must be to provide its delay action. The larger the capacitance value, the more current is required from the transistor for discharging as well as causing current pulse stretching. Thus the transistor is aided in two ways by its last turn-OFF which is aided by diodes 46 and 48 of FIG. 3 and diodes 146 and 148 of FIG. 4.

The circuit just described allows reduction of voltage and power levels to a point where components having lower capabilities to handle these parameters may be utilized successfully. For example, with the circuit described, small, high speed alloy transistors may be used for recording at speeds up to 200 kilocycles with current pulse widths of 2 microseconds. In an embodiment where two parallel transistors are used the beta requirement may be approximately 10 at 250 milliamperes $I_C$, the required collector voltage being approximately 35 volts. The dissipation depends on the speed of the transistor. With two common switching units having typical alpha cut-off frequencies of 3.0 megacycles measured dissipation of less than 60 milliwatts per transistor has been realized. To repeat, the dotted lines depict the values in a state of the art circuit while the solid lines represent the values present in a circuit embodying the invention. It may thus be seen that for any record system the use of this invention reduces the power dissipated in the component parts.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. A circuit for driving an inductive load comprising signal amplifying means and pulse delay means interconnecting said signal amplifying means and the inductive load to be driven, said pulse delay means comprising an impedance-diode parallel configuration serially connected to a capacitive member whereby the capacitive member is charged between the periods of output signals and discharges during the generated pulse time and upon cessation of the pulse, begins to charge again to thereby decrease the current flow to the inductive load from the signal amplifying means near the end of the signal pulse.

2. A record drive circuit comprising first AND gate means responsive to a plurality of input signals representing the existence of one out of two possible record signals for generating output indicia upon the simultaneous reception of input signals, multivibrator means for generating timed signals for conduction to the said first AND gates to act as one input thereto, amplifying means connected to the output of the said AND gates for amplifying the AND gate ouput signal, second AND gate means, including at least one AND gate for each of the two possible record signals, arranged to generate an output signal upon the simultaneous occurrence of signals from its associated amplifying means and the multivibrator means, record amplifier means for indpendently amplifying each of the outputs of the second AND gates, record head means arranged to be electrically driven by the said record amplifier, and control means including current storage circuitry for affecting the current flow through the said head means.

3. The apparatus of claim 2 wherein the control means includes a varistor serially connected between a portion of the head means and a current source.

4. The apparatus of claim 2 wherein the control means includes a current storage member connected between the amplifier and head means for absorbing a portion of the current surge which would otherwise pass through the amplifier means.

5. The apparatus of claim 2 wherein the control means includes a varistor serially connected between a portion of the head means and a current source and also includes a current storage member connected between the amplifier and head means for absorbing a portion of the current surge which would otherwise pass through the amplifier means.

6. A record drive circuit comprising a plurality of AND gates for receiving signals whose simultaneous occurrence will cause the recordation of one of a plurality of possible signals, multivibrator means associated with the output of each AND gate for generating a pulse upon the existence of an AND gate output, amplifier means associated with each of the multivibrator outputs for amplifying the multivibrator signal, induction record means connected to the said amplifier means, and control means including current storage circuitry associated with the amplifier and record means for affecting the current flow through the amplifier and record means.

7. The apparatus of claim 6 wherein the control means includes a varistor serially connected between a portion of the record means and a current source whereby control of the current through the record means is effected.

8. The apparatus of claim 6 wherein the control means also includes a current storage apparatus connected between the amplifier and record means for temporarily storing a portion of the current surge which would otherwise immediately pass through the amplifier means.

References Cited by the Examiner

UNITED STATES PATENTS

| | | | |
|---|---|---|---|
| 2,734,186 | 2/1956 | Williams | 340—174.1 |
| 2,838,675 | 6/1958 | Wanless | 340—174.1 X |
| 2,862,199 | 11/1958 | Scott | 340—174.1 |
| 2,917,726 | 12/1959 | Golden | 340—174.1 |
| 3,035,255 | 5/1962 | Tuttle | 340—174.1 |
| 3,038,146 | 6/1962 | Unger | 340—174 |

BERNARD KONICK, *Primary Examiner.*

IRVING L. SRAGOW, *Examiner.*

UNITED STATES PATENT OFFICE
CERTIFICATE OF CORRECTION

Patent No. 3,233,246 February 1, 1966

Alan K. Jensen

It is hereby certified that error appears in the above numbered patent requiring correction and that the said Letters Patent should read as corrected below.

Column 2, line 23, strike out "ment may utilize a standard machine clock for the tim-" and insert instead -- voltage and current are instantaneously high. --; column 7, line 29, for "last" read -- fast --.

Signed and sealed this 26th day of September 1967.

(SEAL)
Attest:

ERNEST W. SWIDER
Attesting Officer

EDWARD J. BRENNER
Commissioner of Patents